US011461486B2

(12) United States Patent
Holmes et al.

(10) Patent No.: US 11,461,486 B2
(45) Date of Patent: Oct. 4, 2022

(54) PARTIAL PAGE APPROVAL MODEL

(71) Applicant: Oracle International Corporation, Redwood Shores, CA (US)

(72) Inventors: Madeleine Dawn Holmes, Darlington (GB); Surendra Nath V. N. R. K Nukala, Fremont, CA (US); Chaitanyasri Molakalapalli, Hyderabad (IN); Anveshan Reddy Kunduru, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 350 days.

(21) Appl. No.: 16/663,924

(22) Filed: Oct. 25, 2019

(65) Prior Publication Data

US 2021/0124834 A1   Apr. 29, 2021

(51) Int. Cl.
*G06F 21/62* (2013.01)
*G06F 16/23* (2019.01)
*G06F 9/451* (2018.01)

(52) U.S. Cl.
CPC ......... *G06F 21/6218* (2013.01); *G06F 9/451* (2018.02); *G06F 16/2379* (2019.01)

(58) Field of Classification Search
CPC ... G06F 21/6218; G06F 16/2379; G06F 9/451
See application file for complete search history.

(56) References Cited

U.S. PATENT DOCUMENTS

| | | | |
|---|---|---|---|
| 7,716,247 B2 | 5/2010 | Brjazovski et al. | |
| 9,239,858 B1 | 1/2016 | Willeford | |
| 10,095,763 B1 | 10/2018 | Colgrove et al. | |
| 11,068,462 B1 | 7/2021 | Grzech et al. | |
| 2002/0138483 A1 | 9/2002 | Bretl et al. | |
| 2004/0230621 A1 | 11/2004 | Croisettier et al. | |
| 2005/0108295 A1* | 5/2005 | Karimisetty | G06F 16/8373 |
| 2006/0248128 A1* | 11/2006 | Acharya | G06F 16/2358 |
| | | | 707/999.203 |
| 2006/0288173 A1 | 12/2006 | Shen | |
| 2007/0118572 A1 | 5/2007 | Fischer et al. | |
| 2007/0180075 A1 | 8/2007 | Chasman et al. | |
| 2007/0219976 A1 | 9/2007 | Muralidhar et al. | |
| 2007/0283011 A1 | 12/2007 | Rakowski et al. | |
| 2008/0005332 A1 | 1/2008 | Pande et al. | |
| 2009/0300017 A1 | 12/2009 | Tokusho et al. | |

(Continued)

*Primary Examiner* — Cesar B Paula
*Assistant Examiner* — Zelalem Shalu
(74) *Attorney, Agent, or Firm* — Invoke

(57) ABSTRACT

Techniques are described herein for handling transactions where only a portion of submitted changes are committed. In some embodiments, a system receives, through a page of a user interface, a request to submit a plurality of changes to a set of data objects. The system identifies, based on the page of the user interface through which the request was submitted, a first subset of one or more changes that require further review and a second subset of one or more changes that do not require further review before being committed to the database. The first subset of one or more changes are cached for further review, and a respective approval transaction may be initiated. A commit transaction may be initiated directly for the second set of one or more changes to commit the changes to the database without further review.

20 Claims, 6 Drawing Sheets

(56) References Cited

U.S. PATENT DOCUMENTS

| | | |
|---|---|---|
| 2009/0327817 A1 | 12/2009 | Iyengar et al. |
| 2010/0174694 A1 | 7/2010 | Staebler et al. |
| 2015/0012399 A1 | 1/2015 | Ceribelli et al. |
| 2015/0032710 A1 | 1/2015 | Latrous et al. |
| 2017/0235710 A1 | 8/2017 | Simons et al. |
| 2018/0089299 A1 | 3/2018 | Collins et al. |
| 2018/0260258 A1 | 9/2018 | Wester |
| 2019/0163632 A1 | 5/2019 | Walker et al. |
| 2019/0205244 A1 | 7/2019 | Smith |
| 2020/0151279 A1* | 5/2020 | Haberstroh ............... G06F 8/38 |

* cited by examiner

PARTIAL PAGE APPROVAL MODEL

RELATED APPLICATIONS; INCORPORATION BY REFERENCE

This application is related to U.S. Provisional Patent Application 62/857,760, filed Jun. 5, 2019, titled "Application Driven Data Change Conflict Handling System", which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates, generally, to managing database transactions. In particular, the present disclosure relates to a data model through which a portion of changes submitted through a data entry page are committed and another portion are cached for further review while maintaining data consistency and concurrency.

BACKGROUND

Many web applications and other types of software systems include user interfaces designed to facilitate data entry and manipulation. For instance, a web application may present through a client, such as a web browser or mobile application, a set of graphical user interface (GUI) objects that allow a user to view, add, edit, delete, and/or otherwise modify data that is stored in an underlying database. A user may input data into text boxes and/or other GUI fields and submit the changes to initiate a transaction with the underlying database.

Generally, each data entry submission is handled as an atomic transaction. Atomicity is a feature where all data entry operations in a transaction are performed or none of them are. For example, if a submitted transaction updates ten rows, and one or more rows fails to update in the transaction, then the system rolls back any changes made to the other rows. Thus, atomicity prevents partial updates from occurring.

Atomicity helps ensure consistency in a database and protect against different transactions interfering with one another. For example, a transaction for moving a database record from one table to another may include an operation for deleting the record from the first table and inserting the record into the second table. If the delete operation is performed but the insert operation fails, then the record may disappear if a rollback is not executed. An atomic database transaction prevents this scenario from occurring. However, strict adherence to atomicity may limit application flexibility and lead to inefficiencies. For instance, the application may be required to wait for all changes to be approved even though one or more of the changes may not be dependent on other submitted changes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
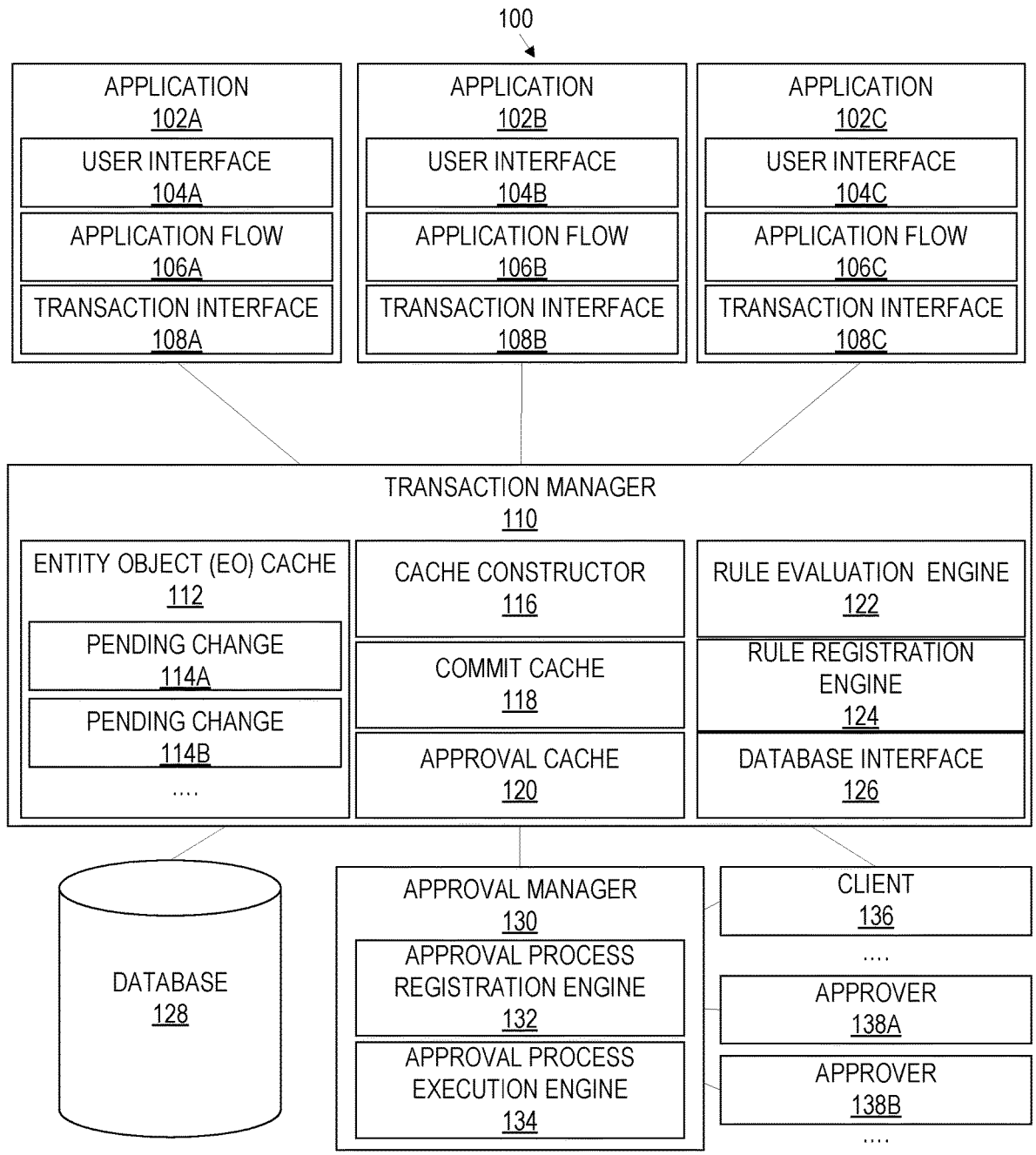
FIG. 1 illustrates an example system implementing a partial approval and partial commit model in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
2.0 SYSTEM ARCHITECTURE
3.0 PARTIAL CACHE/PARTIAL COMMIT MODEL
   3.1 PAGE SUBMISSIONS AND PROCESS OVERVIEW
   3.2 CACHE MANAGEMENT AND DATA CONSISTENCY
   3.3 APPROVAL TRANSACTION PROCESSING
4.0 RULE DEFINITIONS AND EVALUATIONS
   4.1 APPLICATION, INTERFACE, USER, AND DATA-BASED RULES
   4.2 RULE EVALUATION PROCESS
5.0 COMPUTER NETWORKS AND CLOUD NETWORKS
6.0 MICROSERVICE APPLICATIONS
7.0 HARDWARE OVERVIEW
8.0 MISCELLANEOUS; EXTENSIONS

1.0 General Overview

Systems and methods described herein provide a page transaction model for managing changes submitted through user interface pages. In some embodiments, the page transaction model includes a transaction framework for separating submitted changes into multiple database transactions. Individual database transactions may be managed asynchronously and independently. If a change in one database transaction fails, then changes in other transactions that were generated as part of the same page submission do not need to be rolled back. Thus, the completion of one transaction is not held up waiting for another transaction that was part of the same page submission, which allows for more streamlined interfaces and efficient database commits.

In some embodiments, the transaction framework allows registration of different rules and conditions for separating the submitted changes. Registration provides flexibility in how the framework groups changes into transactions for a given user interface page. As an example, pages from different application flows may target changes to the same set of database records but may be handled differently based on application-specific rules. For one page, a transaction manager may group all changes to the database records into a single commit transaction and, for a different page, the transaction manager may separate changes to the same database records into different database transactions. In the former case, if the transaction fails, any changes that were made during execution of the transaction may be rolled back. In the latter case, changes may be committed even when changes to a different transaction fail. Thus, the framework allows application-specific context to be factored into what changes are interrelated on a given page and the atomicity of a page submission.

In some embodiments, the transaction framework distinguishes between changes on a page that require further review before being committed and those that may be committed without further review. Further review may be required for a given transaction for a variety of reasons, depending on the particular application. In some cases, a given user may not have authority to unilaterally submit a change to a database to protect the security and integrity of the underlying data from malicious and/or unintentional corruption. In other cases, a pending change may exist in a draft state until another related field in a page is completed to avoid partial transactions. In these cases, a change may exist in a draft state until the user has a chance to complete the other related fields in the user interface. Additionally or alternatively, other application-specific reasons may give rise to further review of a transaction.

In some embodiments, when changes are submitted through a user interface page, the transaction framework identifies which changes on the page require approval and which changes may be committed directly without further review. The transaction framework may use the previously mentioned rules and conditions to determine whether a database change is permitted to bypass approval or not. The transaction framework may further separate the changes into different caches. For example, an approval cache may store the changes pending approval and initiate an approval transaction on those changes. Additionally or alternatively, the transaction framework may store changes that may bypass approval in a commit cache and initiate a commit transaction.

In some embodiments, the transaction framework registers approval process definitions for managing approval transactions. An approval process definition may define a flow comprising steps and conditions that must be satisfied for a transaction to be approved. When an approval transaction is initiated, an approval manager may load a process definition that has been registered for the user interface page. The approval manager may execute steps and evaluate the conditions defined by the process definition to determine whether the changes are approved. The approval manager may route the transaction to one or more approver nodes defined by the process. An approver node may correspond to an authorized approver, which may be a user or an automated process. If approved, the transaction framework may commit the changes to the database. If denied, then the transaction framework may prevent the changes from being committed to protect data security and integrity.

In some embodiments, the transaction framework monitors the states of transactions initiated for a given page submission. Example states may include, but are not limited to, committed, pending, and failed/denied. A committed transaction is one in which the changes have been persisted or otherwise saved to the database. Committed changes are visible to applications and other users of the database. A transaction in a pending state is one that has not committed or failed. For example, the transaction may be pending approval or a transaction commit may not have completed yet. In some cases, the transaction framework may issue a lock to prevent other database clients from modifying database objects that have changes pending. A transaction in a failed state is one for which the changes could not be committed to the database. A transaction may fail for a variety of reasons. Examples include, but are not limited to, the transaction being denied during the approval process, occurrence of an error such as a hardware failure during the transaction commit or approval process, and conflicting changes made by another database client such as those made to a database object by another application between loading of the user interface page and submission of the changes to the database object.

In some embodiments, a user interface page may be refreshed to reflect the current state of transactions initiated for a given submission. For example, the user interface page may present a visual indication of which changes were committed, which changes are pending approval, and/or which changes were denied. A user may then edit and/or resubmit changes through the user interface page. Additionally or alternatively, the user may be presented with another page in an application flow, which may account for the current state of transactions based on a previous page submission.

One or more embodiments described in this Specification and/or recited in the claims may not be included in this General Overview section.

2.0 System Architecture

FIG. 1 illustrates system 100 for implementing a partial approval and partial commit model in accordance with some embodiments. As illustrated in FIG. 1, system 100 includes applications 102*a-c*, transaction manager 110, database 128, and approval manager 130. System 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Applications 102*a-c* are a plurality of computing applications with access to shared data within database 128. In some embodiments, each application provides respective user interfaces 102*a-c*, application flows 106*a-c*, and transaction interface 108*a-c*. A user interface may comprise hardware and/or software configured to facilitate communications between a user and the application. An application may be configured to render user interface elements and receives input via user interface elements. Example interfaces include, but are not limited to, a graphical user interface (GUI), a web interface, a command line interface (CLI), a haptic interface, and a voice command interface. Example user interface elements include, but are not limited to, checkboxes, radio buttons, dropdown lists, list boxes, buttons, toggles, text fields, date and time selectors, command lines, sliders, pages, and forms.

In some embodiments, user interfaces 104a-c include pages through which changes may be submitted to database 128. A user interface page may include any interface through which a user may view and/or modify data in database 128. A page may include one or more of the user interface elements previously described, such as text boxes and/or other GUI fields, to submit changes and initiate a transaction with database 128. A page may be specified in one or more languages that may be interpretable or executable by an application. For example, a webpage may specify the behavior of user interface elements in a dynamic programming language, such as JavaScript. The content of user interface elements may be specified in a markup language, such as hypertext markup language (HTML) or XML User Interface Language (XUL). The layout of user interface elements is specified in a style sheet language, such as Cascading Style Sheets (CSS). A browser application may then render the webpage based on the code. The browser application may allow a user to scroll, enter text, and/or otherwise interact with the webpage. A user interface page may also be specified in one or more other programming languages, such as Java, C, or C++. Additionally or alternatively, other mobile and/or desktop applications may include logic for rendering the page based on what is specified in the programming languages.

In some embodiments, application flows 106a-c define sequences of pages. For example, a project management application flow may allow a use to view existing projects on a first page. The user may then select to create a new project or view an existing project to navigate to a second page. For a new project, a second page in the flow may allow a user to define parameters of the project, such as the project name, timeline, etc. A third page of the flow may allow a user to add resources to the project. As another example, an online shopping cart application may allow a user to view contents temporarily stored in the cart. Upon selecting "Checkout", the user may be directed to a second page where the user may enter shipping and billing information. A third page may allow a user to review/edit the submitted order. The number of pages and the types of pages may vary from one application flow to the next.

Transaction interfaces 108a-c provide an interface and communication protocol between applications 102a-c and transaction manager 110. In some embodiments transaction interfaces 108a-c comprise an application programming interface (API) through which one or more functions of transaction manager 110, described further herein, may be invoked. For example, an application may register rules and/or approval process definitions. Additionally or alternatively, an application may submit changes to database 128.

In some embodiments, applications 102a-c are different applications in an integrated suite of applications. Each application may comprise software and/or hardware for performing a set of one or more application-specific functions. For example, an enterprise management (EM) system may include, but is not limited to, a set of interrelated applications for testing, deploying, operating, monitoring, diagnosing, and/or resolving problems among deployed hardware and/or software resources. As another example, an enterprise resource planning (ERP) system may include, but is not limited to, a set of interrelated applications for managing employees, coordinating sales, providing customer services (CRM), automating accounting operations, and/or supporting business intelligence (BI) operations. Additionally or alternatively, applications 102a-c may include other applications that share access to data stored in data repository 104.

One or more of applications 102a-c may be a cloud service, such as a software-as-a-service (SaaS) or a web service. Users may access cloud services using a client, such as a web browser, mobile application, or other software application communicatively coupled to a network. The client may interact with cloud services using one or more communication protocols, such as HTTP and/or other communication protocols of the Internet Protocol (IP) suite. Additionally or alternatively, one or more of applications 102a-c may be locally accessible to a user, such as a desktop or other standalone application.

In some embodiments, transaction manager 110 comprises a framework for managing transactions with database 128. Transaction manager 110 may receive changes submitted through user interfaces 104a-c and group changes based on associated rules and conditions. Transaction manager 110 may include entity object (EO) cache 112, cache constructor 116, commit cache 118, approval cache 120, rule evaluation engine 122, rule registration engine 124, and database interface 126.

Entity object (EO) cache 112 tracks pending changes (e.g., pending changes 114a-b) to database 128 by applications 102a-c. In some embodiments, a pending change may be stored as an entity object, where an entity object instance is mapped to a database object, such as a row/record of a database table. For example, an entity object instance may store the primary key of a record that is being added, deleted, updated, or otherwise modified from a database table. A primary key in this context refers to a value that uniquely identifies a database record. The primary key may be generated as a function of values from a column or combination of columns that do not have the same unique value across multiple records in the same database table.

In some embodiments, EO cache 112 is populated in real-time as users are interacting via user interfaces 104a-c. For example, EO cache 112 may be loaded with entity object instances corresponding to records storing data that is currently being accessed through a page of a user interface. If a user is viewing resources assigned to a particular project, for instance, then transaction manager 110 may load records corresponding to each resource into EO cache 112. As a user adds, removes, and/or otherwise modifies resources, each entity object instance in EO cache 112 may be updated to track the pending changes.

Cache constructor 116 may be configured to generate and manage caches for use during transaction processing. In some embodiments, cache constructor 116 generates a cache by allocating space from system memory. The size of a cache may vary from implementation to implementation. For example, a default amount of memory may be allocated for the cache or the allocation size may be computed based on the number of changes in a transaction.

In some embodiments, cache constructor 116 is configured to generate commit caches, such as commit cache 118. A commit cache may be populated with changes that are part of a commit transaction. These may include a subset or all of the pending changes in EO cache 112, depending on how the changes are grouped for a given page submission.

Additionally or alternatively, cache constructor 116 may be configured to generate approval caches, such as approval cache 120. An approval cache may be populated with changes that are part of an approval transaction. As with the commit cache, an approval cache may be populated with a subset or all of the pending changes in EO cache 112, depending on how the changes are grouped.

Rule evaluation engine 122 loads and evaluates rules to determine how to group pending changes in EO cache 112. A rule may specify conditions or criteria under which a change may bypass or undergo further approval. Rules may include application-specific, page-specific, user-specific, and/or data-specific criteria. Example rules are provided further in Section 4.0 below, titled "Rule Definitions and Evaluations".

Rule registration engine 124 allows applications and/or other users, such as client 136, to generate and register rules with transaction manager 110. When a rule is registered, transaction manager 110 may create one or more entries within a registration table. Each entry within the registration table may correspond to a mapping between one or more user interface pages and one or more rules. A given rule may be applicable to a single user interface page or multiple user interface pages. Further a user interface page may be mapped to a single rule or multiple rules. Additionally or alternatively, a rule or set of rules may be specified at the level of an application and apply across all pages of the application flow and/or at the level of a page and only apply to a subset of one or more pages in the application flow. If no rules have been defined for a user interface page, then a set of default rules may be applied.

In some embodiments, rule registration engine 124 includes a rule editor to facilitate creation of new rules. For example, a rule editor may provide client 136 with a GUI that guides a user through the process of defining conditions for requiring approval and/or permitting approval bypass. The rule editor may present rule templates based on commonly detected rule patterns as described further below.

Database interface 126 comprises an interface and/or communication protocol for communicating with database 128. In some embodiments, database interface 126 connects via database connection API, such as through a Java Database Connectivity (JDBC) or Open Database Connectivity (ODBC) connection string. Database interface 126 may allow transaction manager 110 to issue database queries, such as structure query language (SQL) statements to update database 128. Example update SQL statements may include, but are not limited to, INSERT statements for adding one or more new records to a table, UPDATE statements for modifying the value of one or more record attributes, and DELETE statements for removing one or more records from a table. If a database operation fails via the database connection, then an exception may be thrown to notify transaction manager 110.

Database 128 may be implemented on any type of storage unit and/or device for storing data. Further, database 128 may include multiple different storage units and/or devices. The multiple different storage units and/or devices may or may not be of the same type or located at the same physical site. Further, database 128 may be implemented or may execute on the same computing system as one or more of applications 102*a-c* and/or transaction manager 110. Additionally or alternatively, database 128 may be implemented or executed on a computing system separate from the other components of system 100. Database 128 may be communicatively coupled to one or more components illustrated in system 100 via a direct connection or via a network.

In some embodiments, approval manager 130 comprises a framework for defining and configuring approval processes. An approval process in this context determines the flow of an approval transaction. An approval process may include, but is not limited to, steps, paths, and stages. A step in a process represents one or more approvers or reviewers. An approver or reviewer may be a human user or an automated process that has been authenticated with approval manager 130. A path in an approval process may comprise a sequence of steps. A stage may include one or more paths. The system may execute stages sequentially. If a stage has multiple paths, then the system may execute the paths in parallel.

In some embodiments, approval manager 130 includes approval process registration engine 132 and approval process execution engine 134. Approval process registration engine 132 may provide an interface through which users, such as an application developer or administrative user, may register applications with the approval framework. Approval process registration engine 132 may register database records, user interface page elements, and/or other components that are associated with an approval transaction.

In some embodiments, each registered application is associated with one or more approval process definitions. Approval process registration engine 132 may maintain a mapping between the registered application/components and the corresponding process definitions. An approval process definition may include code that determines the flow of an approval transaction. For example, an approval process definition may specify stages, paths, and steps of the approval process. The approval process definition may identify authorized approvers or reviewers for a given step within the flow. For example, approvers 138*a-b* may represent authorized approvers for one or more steps of an approval process.

In some embodiments, approval process execution engine 134 is configured to load and execute approval process definitions. When a new approval transaction is initiated, approval process execution engine 134 may load the relevant approval process definition and execute the corresponding stages, paths, and steps. Approval process execution engine 134 may perform a call back to transaction manager 110 to return the result of an approval transaction. Transaction manager 110 may then initiate one or more commit transactions for changes that have been approved, if any. Changes that were not approved are not saved to database 128.

In some embodiments, one or more components of system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In some embodiments, one or more comments of system 100, such as transaction manager 110 and/or approval manager 130, are implemented as a cloud service or microservice application. Additional embodiments and/or examples relating to computer networks and microservice applications are described below in Section 5.0, titled "Computer Networks and Cloud Networks" and Section 6.0, titled "Microservice Applications".

3.0 Partial Cache/Partial Commit Model

3.1 Page Submissions and Process Overview

In some embodiments, the page transaction model comprises a framework for partially caching changes for further review and partially committing changes that are part of a page submission. A partial cache in this context refers to a state in which a subset of the changes in a page submission are stored in a cache but require further review before being persisted or otherwise saved to database 128. A partial commit refers to a state in which another subset of changes in the page submission are directly persisted to database 128 without further review. It is noted that the subset of changes may also be cached. However, these changes may be separated into different in-memory caches to facilitate transaction processing.

Figure 2:
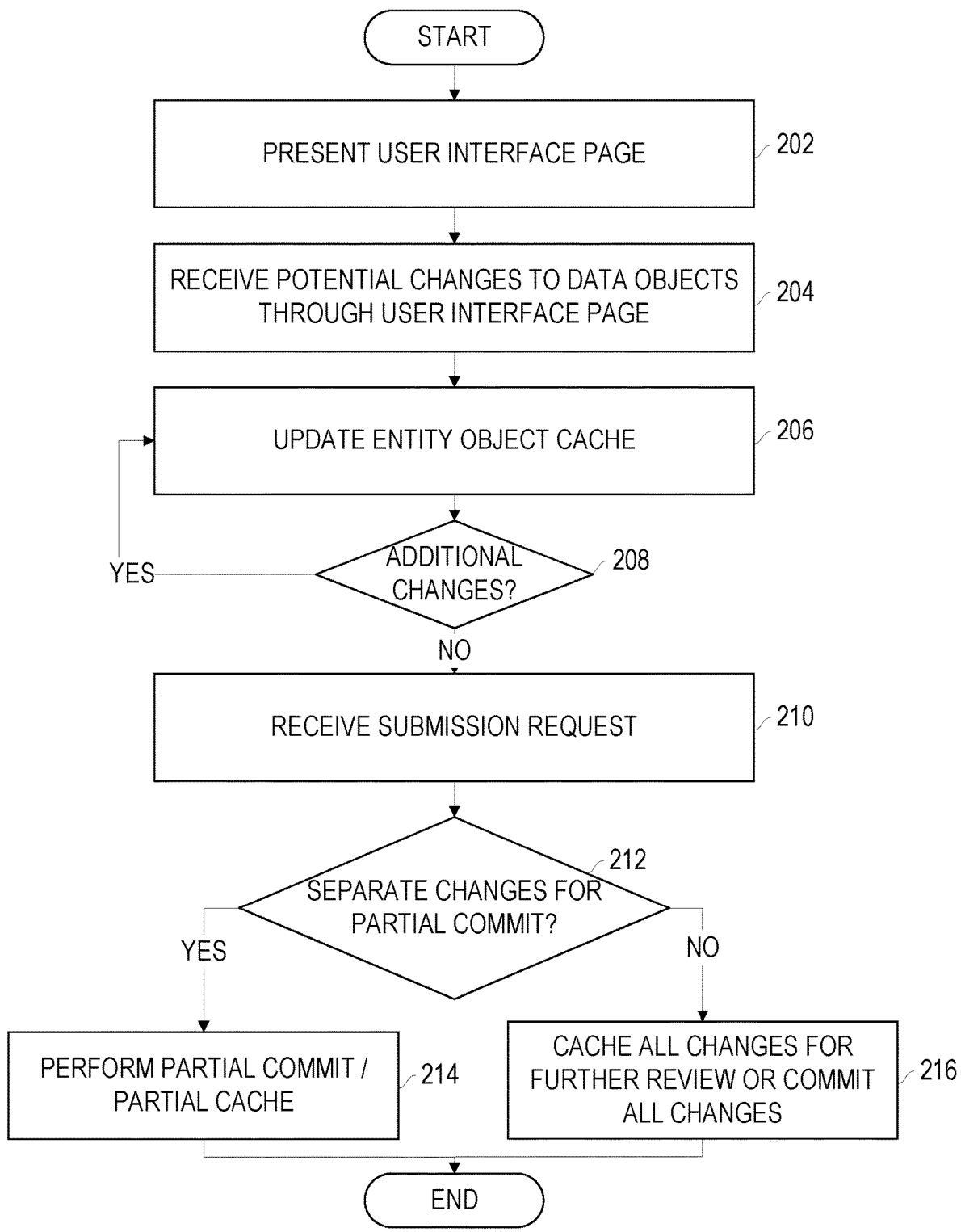
FIG. 2 illustrates an example set of operations for processing changes submitted through a user interface page in accordance with some embodiments.

FIG. 2 illustrates an example set of operations for processing changes submitted through a user interface page in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

The process includes presenting a user interface page (operation 202). For example, the user interface page may be a webpage presented through a web browser, a page of a desktop application, or a page of a mobile application as previously described. In some embodiments, presenting the user interface page includes identifying and loading relevant data from database 128. User interface elements on a page may be mapped to or otherwise linked to database objects, such as through primary keys. The process may identify what database data to present via the interface based on the links. For instance, a CRM application may present the top-n actionable opportunities to a user as ranked by probability of success and/or some other metric. The process may identify records for the top-n opportunities currently committed to a database table, load the relevant information from records, and present the data to the user via the user interface page. The data that is loaded and presented may vary depending on the particular application and user interface page.

The process further includes receiving potential changes to data objects through the user interface page (operation 204). A user may input a potential change through one or more user interface objects on a user interface page. For example, a user may click on or otherwise select a button on a page to add a new entry to a list. Upon selection of the button, the user may be presented with a series of text boxes, drop-down menus, and/or other interface objects to define the new entry, such as inputting the entry name, parameters and/or other attributes. As another example, a user may input edits to existing items on the list or select one or more actions to execute that are available through the user interface.

The process further includes updating the EO cache 112 based on potential changes received through the user interface page (operation 206). In some embodiments, EO cache 112 is initially populated with entity objects corresponding to database records and/or tables used to populate the user interface. The user interface may provide information about potential changes to transaction manager 110 continuously, periodically, or upon request. A potential change may be identified based on interactions between the user and one or more interface objects. A potential change may include changes that the user has not submitted through the page interfaces. EO cache 112 may track these potential changes in real-time as the user is inputting data.

The process may continue to monitor for additional changes until a submission request is received through the page interface (operation 208). If additional changes are received, then the process may return to operation 206 to update EO cache 112.

The process further includes receiving a submission request through the user interface page (operation 210). The user may submit the request by selecting or otherwise interacting with one or more corresponding user interface elements in the user interface page. For example, the user may click on a "Submit", "OK", or "Continue" button. The interface for submitting changes may vary depending on the particular application.

The process further includes determining whether to separate changes for a partial commit transaction (operation 212). In some embodiments, the process flags potential changes in EO cache 112 that require further review or that may bypass approval. The changes may be classified based on rules defined for the user interface page. Example rules are described further below in Section 4.0, titled "Rule Definitions and Evaluations."

Once the changes have been separated, then the process performs a partial commit and a partial cache (operation 214). The commit transaction may include a subset of the changes from EO cache 112 that were classified as being permitted to bypass further review. In some embodiments, these changes may be separated into multiple commit transactions, depending on the rules registered for the page interface. Each commit transaction may be handled atomically. Additionally or alternatively, changes in the review cache may be added to one or more approval transactions.

If the process determines that the changes do not need to be separated, then the changes are added to a review cache or directly committed (operation 216). The former case may occur when all submitted changes require further review and the latter case may occur when none of the changes require further review.

3.2 Cache Management and Data Consistency

The transaction framework may be configured to manage caches in a manner that maintains data consistency across multiple user interface applications which may be concurrently accessing data from database 128. In some embodiments, committed changes are saved to database 128 and become accessible to other applications. Changes that are pending further review are not saved to the database 128 until approval is obtained, either from an automated process or through manual review.

If another application is concurrently operating on an old version of the data when a commit occurs or that has a change pending approval, then a flag may be raised to indicate that the data has become dirty. Additionally or alternatively, conflict resolution rules may be applied when two applications are attempting to modify the same data. Example conflict resolution rules are described in U.S. Provisional Appl. 62/857,760, titled "Application Driven Data Change Conflict Handling System", previously incorporated by reference.

Figure 3:
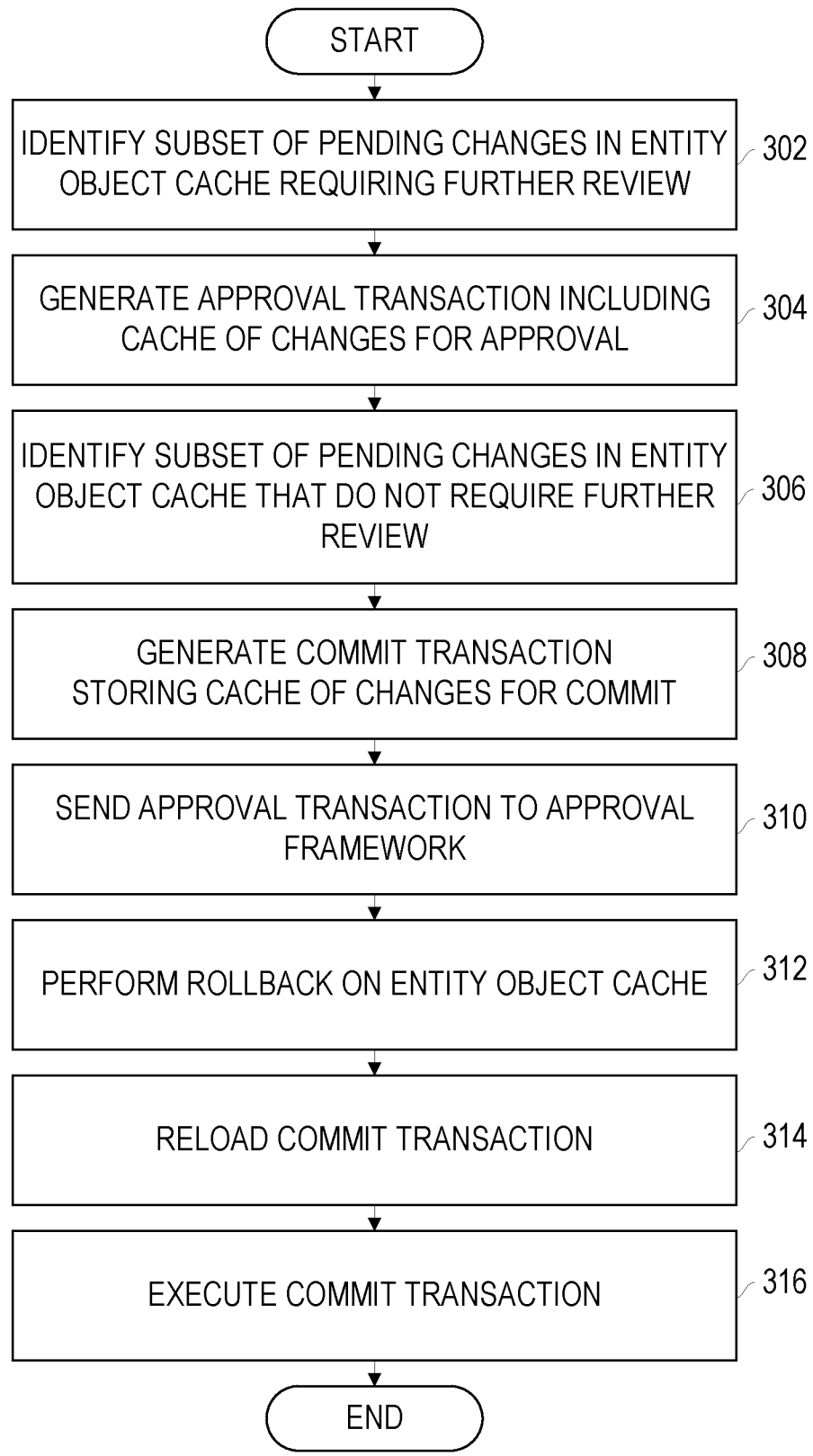
FIG. 3 illustrates an example set of operations for constructing separate transactions for a page submission while maintaining consistency between a database and a user interface in accordance with some embodiments.

In some embodiments, changes in a page submission that require further review are migrated to a separate cache from changes that may be directly committed to facilitate transaction processing. FIG. 3 illustrates an example set of operations for constructing separate transactions for a page submission while maintaining consistency between a database and a user interface in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

The process includes identifying a subset of pending changes in EO cache 112 requiring further review (operation 302). In some embodiments, the process identifies the subset pending changes by iterating through each object in EO cache 112 to search for items that have been flagged or otherwise classified by rule evaluation engine 122 as requiring further review.

The process further includes generating an approval transaction including a cache of the subset of changes identified as requiring further review/approval (operation 304). The process may allocate memory for the review cache on the fly or it may have been pre-allocated, depending on the particular implementation. A change that is stored in the cache in this context represents a change to a database object made through a database query, such as through execution of a SQL statement. The cache may store the database query itself or a data object storing data sufficient to construct the database query. For instance, an object in the cache may include or be used to construct an UPDATE, INSERT, DELETE, and/or any other Data Manipulation Language (DML) statement.

The process further includes identifying a subset of pending changes in EO cache 112 that do not require further review before being committed (operation 306). In some embodiments, these may include all remaining changes that were not identified in operation 302. In other embodiments, the process may iterate the EO cache 112 to search for items that were classified by rule evaluation engine 122 as being permitted to bypass approval.

The process further includes generating a commit transaction including a cache of the subset of changes identified as permissible to bypass approval (operation 308). As with the review cache, the commit cache may be constructed from pre-allocated memory or memory allocated on demand. The cached changes may further include or be used to construct database queries, such as SQL statements, as previously indicated.

The process further includes sending the approval transaction to an approval framework (operation 310). Upon receiving an approval transaction, approval manager 130 may load the relevant approval process definitions and manage the approval process flow. Approval manager 130 may perform callback to transaction manager 110 to provide updates on the current status of each approval transaction. Example states include, but are not limited to, pending, approved, and denied.

The process further includes performing a rollback on EO cache 112 (operation 312). The rollback helps to maintain consistency between the user interface applications and database 128. Once an approval transaction has been initiated, approval and committal may occur at any moment. Rolling back EO cache 112 removes all changes from the cache to avoid an inconsistent state.

The process next reloads the commit transaction to EO cache 112 (operation 314). The reloaded transaction includes the subset of changes identified at operation 306.

The process then executes the commit transaction (operation 316). Once committed, the user interface may be refreshed to reflect the changed data. These changes may be become viewable other user interface pages in the application flow and other user interface applications accessing the data.

Figure 4:
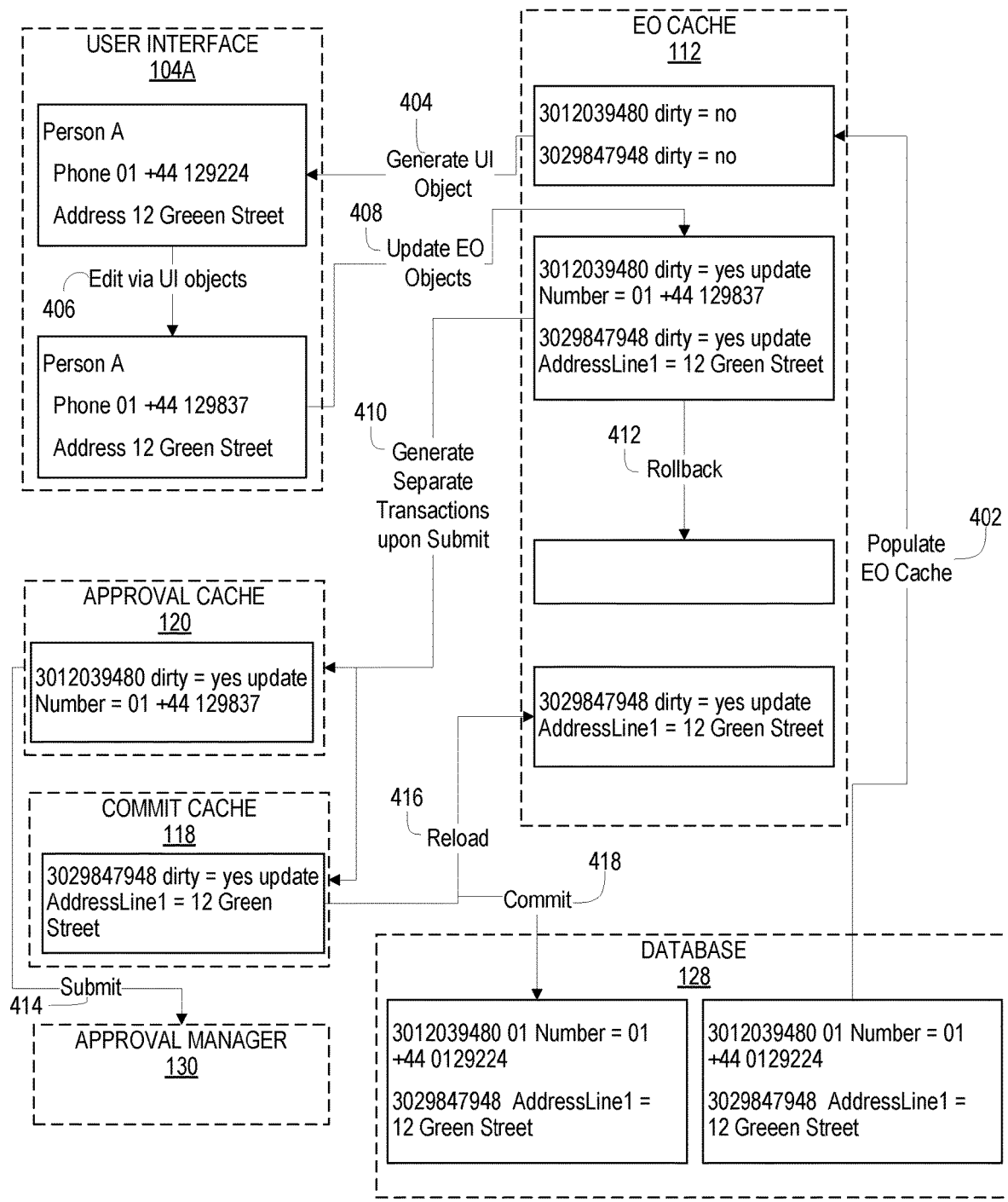
FIG. 4 illustrates an example data flow diagram following a partial cache and partial commit model in accordance with some embodiments.

FIG. 4 illustrates an example dataflow diagram following a partial cache and partial commit model in accordance with some embodiments. The dataflow includes populating EO cache 112 with data from database 128 (operation 402). In the present example, the loaded data includes two entity objects: one corresponding to a phone number from a database record and another corresponding to a street address. Each object further includes a primary key to uniquely identify the database record storing the data within database 128. When the objects are initially loaded into EO cache 112, a flag is set to indicate that these objects are not dirty.

Application 102a then renders a set of user interface objects to present via user interface 104a (operation 404). In some embodiments, generating user interface 104A includes binding the data from the entity objects to the user interface objects and rendering the interface objects via a client application. For example, the process may bind the phone number and address values to corresponding text boxes or other user interface objects. A webpage browser may interpret the UI code, including the data binds, to render and display a webpage including the user interface objects having the bind values. In the present example, the webpage may display fields that allow a user to view and edit Person A's phone number and address.

User interface 104a may then receive edits to the presented data via the corresponding user interface objects (operation 406). In the present example, a user has updated Person A's phone record to a new number. The user has also updated the address to correct a typographical error, removing an extra "e" from the street name. At this point in the dataflow, these edits represent potential changes. The edits have not yet been committed to the database or submitted by the user. The user may decide to undo or modify the edits without any underlying transactions with database 128 taking place.

The entity objects in EO cache 112 are then updated based on edits received through user interface 104A (operation 408). In the present example, the phone number and the street name have both been updated in EO cache 112. Further, the dirty flag is updated to "yes" to indicate that the data is modified in the cache but not modified in database 128.

Upon receiving a page submission via user interface 104a, transaction manager 110 generates separate approval and commit transactions (operation 410). In the present example, the phone number change is added to approval cache 120, and the address change is added to commit cache 118. In other cases, the address change may be added to approval cache 120 instead of or in addition to the phone number change, or both may be added to commit cache 118, depending on the rules registered for user interface 104A.

Transaction manager 110 further performs a rollback on EO cache 112 (operation 412). The rollback removes all objects from EO cache 112, including the phone number change and address change.

Transaction manager further submits the changes in approval cache 120 to approval manager 130 to initiate the approval transaction (operation 414). Approval manager 130 may manage the approval flow process as previously described and further described in Section 3.3, titled "Approval Transaction Processing".

In some embodiments, the changes in commit cache 118 are reloaded into EO cache 112 (operation 416). The dirty flag is still set to "yes" to indicate that the commit is still pending.

Database 128 may then commit the changes in commit cache 118 (operation 418). In the present example, the address change is persisted to database 128, but not the phone number change, which may still be pending approval. In some implementations, an approval transaction may be committed before a commit transaction, such as if an automated approval process is executed before operations 416 and 418 are completed.

3.3 Approval Transaction Processing

As previously mentioned, an approval framework may handle approval process flows for submitted approval transactions. When an approval transaction is initiated, approval manager 130 may identify one or more approval process definitions associated with the user interface page. For example, approval manager 130 may search the aforementioned mapping table to determine which approval process definitions have been registered with the user interface page. If no rules have been registered, a set of default process may be used.

Approval process execution engine 134 may then load and execute the identified approval process definition. In some embodiments, approval process execution engine 134 identifies the stages, paths, and/or steps in the process definition. Approval process execution engine 134 may execute multiple paths in a given stage in parallel. Steps in the same path may be executed sequentially.

As previously mentioned, a step in an approval process may represent one or more approvers, where an approver may be a human user or an automated process. In some embodiments, execution of a step may include notifying each approver in the step. For example, approval process execution engine 134 may send each approver an email or add the notification to a worklist that is accessible through the approver's account.

If there are multiple approvers for a given step or stage, then the approval process definition may define conditions for granting approval. For example, a step or stage may only be approved in some cases if all approvers approve of a given transaction. As another example, approval may be granted if a majority of approvers grant approval, even if one denies approval. In yet another example, one approver may override another approver and/or approvers may be assigned different weights.

In some embodiments, an approval process definition may include code for defining or linking to an automatic approval process. For example, an automated process for a given step may automatically approve updates that are less than a threshold. If the automated process does not approve the update, then the transaction may be routed to a human user for further review or approval may be automatically denied, depending on the implementation. The process may define any other logic as a function of changes/database operations to automatically approve or prevent a transaction for commit.

The approval framework may handle approval transactions atomically. Thus, the transaction may either be approved or fail as a unit. In other embodiments, the approval framework may allow for individual line items to be independently approved or denied. For example, an approval transaction may comprise an update to an address and phone number. The approval process may approve both updates, approve only one of the updates and deny the other, or deny both updates. Approved changes may be persisted to database 128 via a commit transaction while denied changes are omitted from any commit transactions stemming from the approval transaction results.

4.0 Rule Definitions and Evaluations

4.1 Application, Interface, User, and Data-Based Rules

In some embodiments, users, such as application developers, may register transaction rules with the transaction framework. The transaction rules may control how the transaction framework groups changes into separate transactions. For example, a transaction rule may include logic for classifying entity objects as requiring further review or eligible to bypass further review. A transaction rules may be stored as file or data object including executable or interpretable code. Example rule formats may include, but are not limited to scripts (e.g., written in a scripting language), markup language files (e.g., extensible markup language (XML) files), and JavaScript Object Notation (JSON) files.

Transaction rules may at one or more layers. Examples include, but are not limited to:
- Application-specific rules;
- Interface-specific rules;
- User-specific rules; and
- Data-specific rules.

Application-specific rules may be customized by application developers or administrators for a specific application. For instance, an application developer may specify what application-specific function require further review before being committed to database 128. As an example, an application-specific rule may be defined to require review of all new opportunities added to an opportunity pipeline and/or routing of opportunities to specific users. Other minor updates to the opportunity pipeline may be automatically committed. As another example, a user may define rule to require review of all changes made by a specified application to database 128 or may automatically commit all changes made by the application. Additionally or alternatively, other application-specific rules may also be registered.

Interface-specific rules may be defined for specific user interface pages, regions within a page, groups of user interface objects within a page, and/or individual user interface objects. For example, a user may define a rule that changes submitted through one region of a page require further review, while changes submitted through another region may be directly committed. As another example, a rule may be defined to require review of one input field but not another. Interface-specific rules may be application-specific, but apply to individual pages in an application flow rather than globally across all pages in the application.

User-specific rules may be defined for specific users or classes of users. For example, a rule may include a list of user identifiers for which approval is required and/or a list of users that may bypass approval. As another example, a rule may specify a clearance level threshold to bypass approval. Users with a higher clearance levels, such as administrators or higher-level employees in an enterprise, may be permitted to commit data directly to database 128 via a user interface page while an approval transaction is initiated for submissions received via the user interface from other users.

Data-specific rules may be defined to protect sensitive data. For example, a rule may be defined that requires any updates to a sensitive table to be reviewed. As another example a rule may be defined that requires review of updates only to a subset of records within the table. The rule may list the primary key for each sensitive record. Updates made to other records within the table may be committed directly, bypassing an approval transaction.

In some embodiments, conditions and/or other logic may be attached to a rule. For example, a rule defined for a user interface object may require approval if the amount entered by the user exceeds a threshold value. If the threshold is not exceeded, then the change may bypass approval. Additionally or alternatively, more complex combinations of the above rules may be defined. For instance, a rule may be defined to require approval if the amount entered by the user exceeds the threshold value and the user does not meet a clearance threshold. In this case, the value may be committed if either condition is not satisfied (i.e., the amount is less than the threshold or the user meets the clearance threshold). Different user interface objects within the same page may have different rules and conditions attached.

In some embodiments, a rule editor may be presented to a user to facilitate rule creation. The rule editor may provide templates and/or recommendations for creating and binding rules to user interface objects. As an example, the template may recommend and/or present templates for common rule patterns. For instance, a common rule pattern may allow approval to be bypassed if the value in a column is below a threshold amount. A rule template may be presented as follows "IF AMOUNT <[ENTER VALUE HERE], THEN BYPASS APPROVAL". The user may then edit the template by adding the desired threshold and register the rule for a corresponding user interface object.

4.2 Rule Evaluation Process

Figure 5:
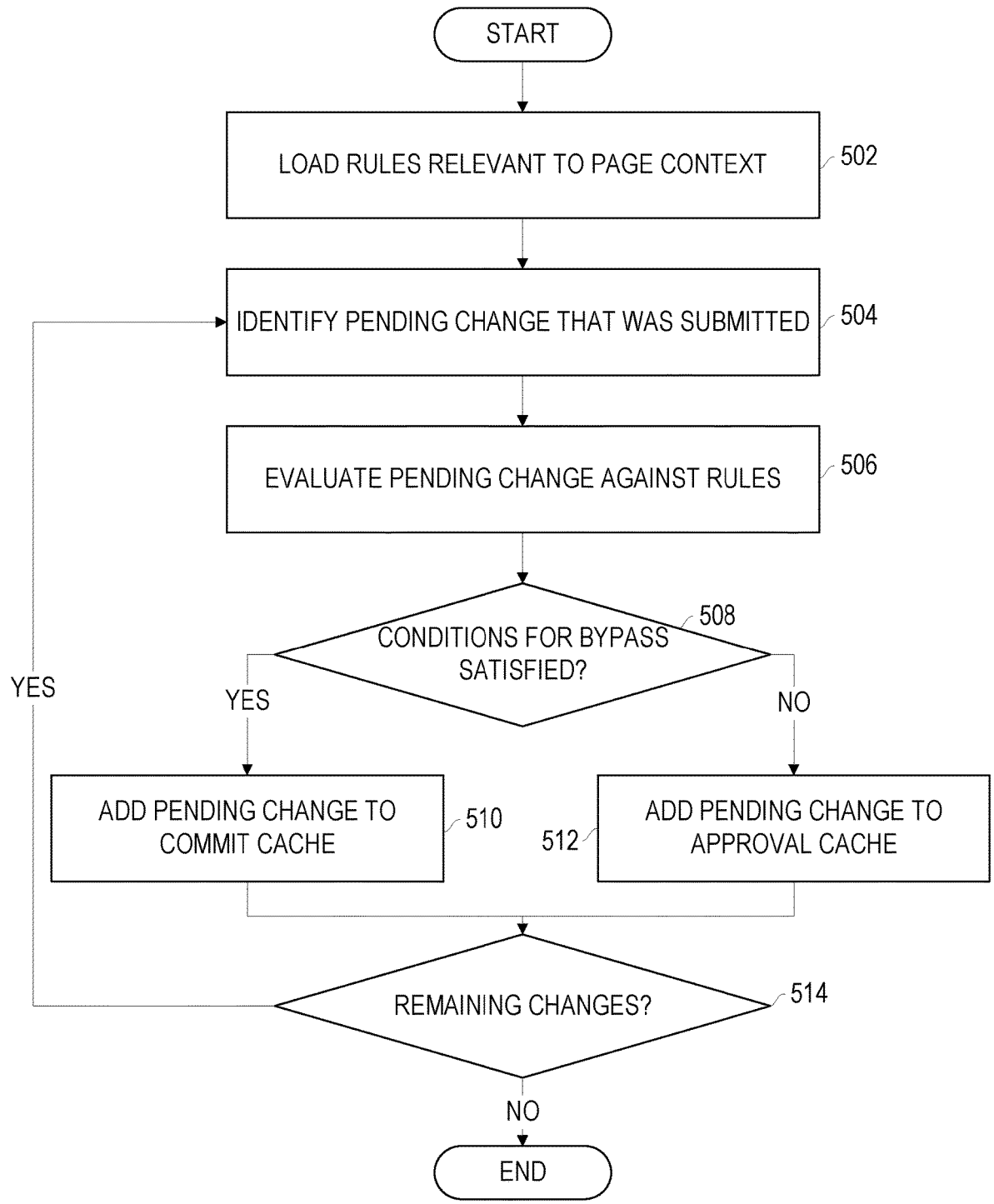
FIG. 5 illustrates an example set of operations for evaluating rules to separate submitted changes into a commit cache and an approval cache in accordance with some embodiments.

When a page submission is received, the submitted changes may be evaluated against a set of registered rules to determine what database transactions to generate and how the changes should be grouped in the transactions. FIG. 5 illustrates an example set of operations for evaluating rules to separate submitted changes into a commit cache and an approval cache in accordance with some embodiments. One or more operations illustrated in FIG. 5 may be modified, rearranged, or omitted all together. Accordingly, the particular sequence of operations illustrated in FIG. 5 should not be construed as limiting the scope of one or more embodiments.

The evaluation process includes loading rules that are relevant to the user interface page context (operation 502). The rules may include the application, interface, user, and/or data-specific rules previously described. Application-specific rules may be identified based on the current application being used. Interface-specific rules may be identified based on the page in the application flow being currently accessed. User-specific rules may be identified based on a user identifier or classification for the user currently accessing the page. Data-specific rules may be identified based on what entity objects are loaded in EO cache 112. As previously noted, a complex or composite rule may be defined as a combination of one or more of the above layers.

The evaluation process further includes identifying a pending change that was submitted (operation 504). For example, the evaluation process may iterate through the changes in EO cache 112.

The process further evaluates the pending change against one or more rules (operation 506). For example, the process may determine whether the rule requires approval based on the database object being modified, the user submitting the modification, the user-interface object through which the modification was submitted, the region of the page where the user-interface objects is rendered, and/or the application-specific functions generating the modification.

Based on the evaluation, the process determines whether the conditions for bypass have been satisfied (operation 508).

If the bypass conditions have been satisfied, then the evaluation process causes the pending change to be added to commit cache 118 (operation 510). In some embodiments, the evaluation process may flag the pending change, and transaction monitor 110 may separate the flagged changes as previously described. In other embodiments, the evaluation process may directly add the change to the commit cache.

If the bypass conditions have not been satisfied, then the evaluation process adds the pending change to the approval cache (operation 512). These changes may also be flagged or add directly during this operation.

The evaluation process further determines whether there are any remaining changes to evaluate (operation 514). If so, then the next change is selected from EO cache 112, and the process repeats until all changes have been evaluated.

The example rules above were given in the context of separating changes between a commit transaction and an approval transaction. However, the rules and rule evaluation process may also separate changes into multiple commit transactions and/or multiple approval transactions. For example, changes from one page region may be grouped in one transaction, while pages from another region may be grouped in another transaction.

Separating changes into multiple commit transactions allows for greater control of the atomicity of transactions initiated for a page submission. For example, a given page submission may be split into two or more commit transactions such that changes that are not related do not fail together. Separating changes into multiple approval transactions allows for different approval flows to be executed for different portions of a page submission. A given approver may be authorized to approve one change made via the page submission but not another.

5.0 Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6.0 Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
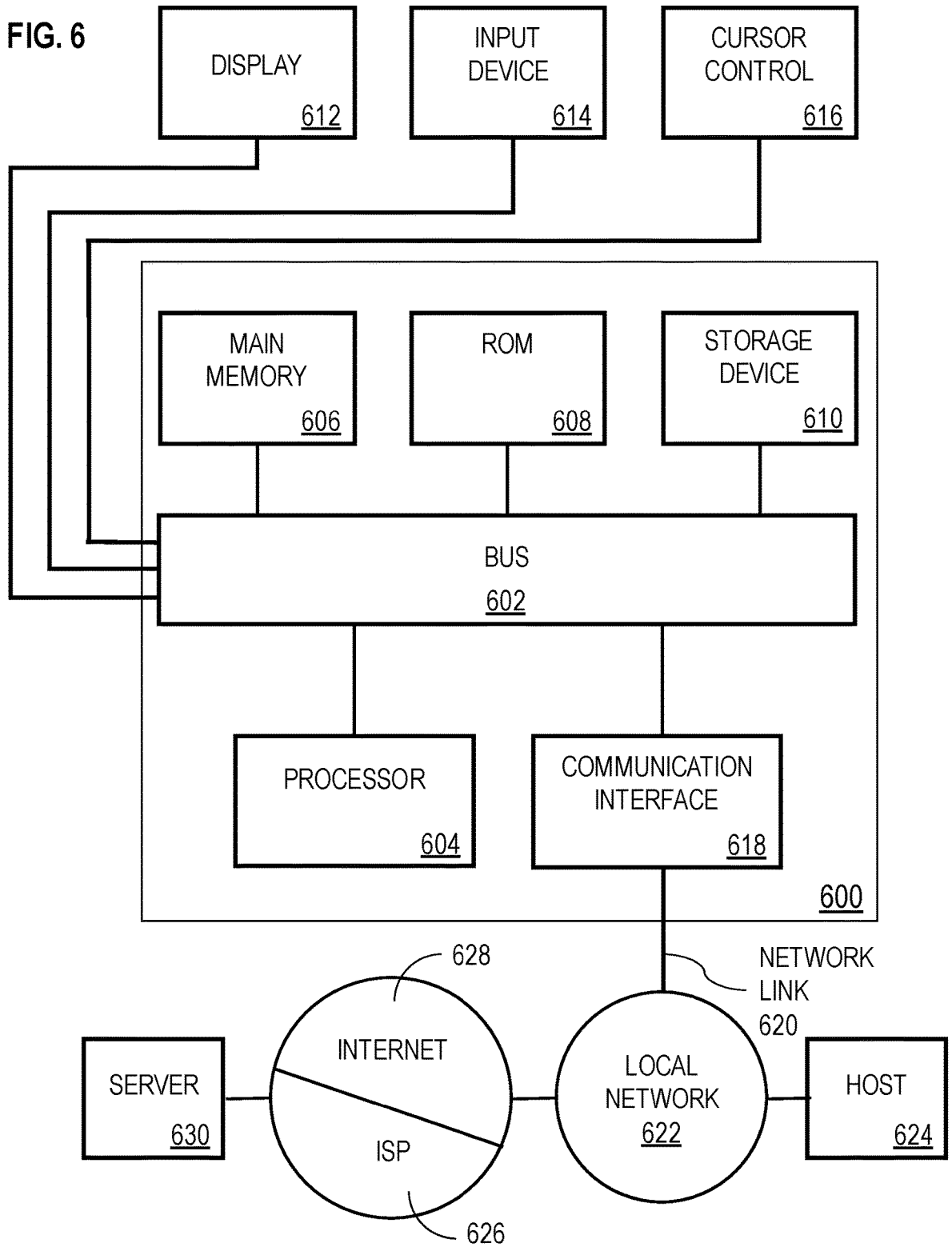
FIG. 6 shows a block diagram that illustrates a computer system in accordance with one or more embodiments.

For example, FIG. 6 is a block diagram that illustrates computer system 600 upon which an embodiment of the invention may be implemented. Computer system 600 includes bus 602 or other communication mechanism for communicating information, and a hardware processor 604 coupled with bus 602 for processing information. Hardware processor 604 may be, for example, a general purpose microprocessor.

Computer system 600 also includes main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes read only memory (ROM) 608 or other static storage device coupled to bus 602 for storing static information and instructions for processor 604. Storage device 610, such as a magnetic disk or optical disk, is provided and coupled to bus 602 for storing information and instructions.

Computer system 600 may be coupled via bus 602 to display 612, such as a cathode ray tube (CRT) or light emitting diode (LED) monitor, for displaying information to a computer user. Input device 614, which may include alphanumeric and other keys, is coupled to bus 602 for communicating information and command selections to processor 604. Another type of user input device is cursor control 616, such as a mouse, a trackball, touchscreen, or cursor direction keys for communicating direction information and command selections to processor 604 and for controlling cursor movement on display 612. Input device 614 typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 600 can receive the data on the network line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

8.0 Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which, when executed by one or more hardware processors, cause:
   receiving, through a page of a user interface, a request to submit a plurality of changes to a set of data objects;
   responsive to receiving the request through the page of the user interface:
      identifying, based on the page of the user interface through which the request was submitted, a first subset of one or more changes, of the plurality of changes, that require further review before being committed to a database and a second subset of one or more changes, of the plurality of changes, that do not require further review before being committed to the database;
      generating, within different caches, separate transactions for the first subset of one or more changes and the second subset of one or more changes, wherein the separate transactions include a first transaction that is stored in a first cache for transactions requiring further review before being committed to the database and a second transaction that is stored in a second cache for transactions that do not require further review before being committed to the database;
   committing the second subset of one or more changes to the database based at least in part on execution of the second transaction stored in the second cache; and
   committing the first subset of one or more changes to the database based at least in part on execution the first transaction stored in the first cache, wherein the second subset of one or more changes are committed before the first subset of one or more changes.

2. The one or more non-transitory computer-readable media of claim 1, wherein the instructions further cause initiating an approval transaction to seek approval from one or more approvers to commit the first subset of one or more changes to the database.

3. The one or more non-transitory computer-readable media of claim 2, wherein the approval transaction includes sending a notification to one or more users that have been authenticated as approvers.

4. The one or more non-transitory computer-readable media of claim 2, wherein the instructions further comprise preventing at least one change in the first subset of one or more changes from being committed to the database responsive to at least one authorized approver denying the at least one change.

5. The one or more non-transitory computer-readable media of claim 2, wherein the approval transaction passes through a chain of approvers defined by an approval process definition associated with the approval transaction.

6. The one or more non-transitory computer-readable media of claim 1, wherein the first subset of one or more changes are assigned to a draft state; wherein changes in the draft state are viewable through the user interface but have not yet been committed to the database.

7. The one or more non-transitory computer-readable media of claim 1, wherein the instructions further cause retrieving a set of one or more rules defined for the page, wherein said identifying comprises determining, as a function of the set of one or more rules, which changes require approval.

8. The one or more non-transitory computer-readable media of claim 7, wherein the set of one or more rules specify which actions available through the page require approval before being executed.

9. The one or more non-transitory computer-readable media of claim 7, wherein the set of one or more rules identify a first set of one or more regions on the page that include data entry fields requiring further review before being committed and a second set of one or more regions on the page that include data entry fields where changes are directly committed bypassing further review.

10. The one or more non-transitory computer-readable media of claim 7, wherein the set of one or more rules specify conditions for allowing approval to be bypassed; wherein the first subset of one or more changes do not satisfy the conditions; and wherein the second subset of one or more changes satisfy the conditions.

11. The one or more non-transitory computer-readable media of claim 1, wherein said identifying is further based at least in part on a primary key for each respective data object in the database that the first subset of one or more changes and the second subset of one or more changes are attempting to modify.

12. The one or more non-transitory computer-readable media of claim 1, wherein the instructions further cause tracking potential changes in real-time as a user is entering data through the page of the user interface; wherein the first subset of one or more changes and the second subset of one or more changes are identified from the potential changes and separated into the first cache and a second cache responsive to the user submitting the potential changes through the page of the user interface.

13. The one or more non-transitory computer-readable media of claim 12, wherein tracking the potential changes comprises identifying a primary key for each object in the database affected by at least one of the potential changes.

14. The one or more non-transitory computer-readable media of claim 12, wherein separating the changes comprises performing a rollback of the potential changes in the second cache and repopulating the second cache with the second subset of one or more changes but not the first subset of one or more changes.

15. The one or more non-transitory computer-readable media of claim 1, wherein instructions further cause refreshing the page of the user interface; wherein the refreshed page distinguishes between changes that have been committed to the database and changes that are pending review.

16. The one or more non-transitory computer-readable media of claim 15, wherein the refreshed page further distinguishes between changes that are in a draft state and are pending review from a user that submitted the changes and changes that are pending approval from another user.

17. The one or more non-transitory computer-readable media of claim 1, wherein the instructions further cause:
tracking potential changes in real-time as a user is entering data through the page of the user interface;
wherein tracking the potential changes comprises identifying a primary key for each object in the database affected by at least one of the potential changes;
wherein the first subset of one or more changes and the second subset of one or more changes are identified from the potential changes and separated into the first cache and a second cache responsive to the user submitting the potential changes through the page of the user interface;
wherein separating the changes comprises performing a rollback of the potential changes in the second cache and repopulating the second cache with the second subset of one or more changes but not the first subset of one or more changes;
retrieving a set of one or more rules defined for the page, wherein said identifying comprises determining, as a function of the set of one or more rules, which changes require approval;
wherein the set of one or more rules specify conditions for allowing approval to be bypassed;
wherein the first subset of one or more changes do not satisfy the conditions; and wherein the second subset of one or more changes do not satisfy the changes; and
refreshing the page of the user interface; wherein the refreshed page distinguishes between changes that have been committed to the database and changes that are pending review.

18. A system comprising:
one or more hardware processors;
one or more non-transitory computer-readable media storing instructions, which, when executed by one or more hardware processors, cause:
receiving, through a page of a user interface, a request to submit a plurality of changes to a set of data objects;
responsive to receiving the request through the page of the user interface:
identifying, based on the page of the user interface through which the request was submitted, a first subset of one or more changes, of the plurality of changes, that require further review before being committed to a database and a second subset of one or more changes, of the plurality of changes, that do not require further review before being committed to the database;
generating, within different caches, separate transactions for the first subset of one or more changes and the second subset of one or more changes, wherein the separate transactions include a first transaction that is stored in a first cache for transactions requiring further review before being committed to the database and a second transaction that is stored in a second cache for transactions that do not require further review before being committed to the database;
committing the second subset of one or more changes to the database based at least in part on execution of the second transaction stored in the second cache; and
committing the first subset of one or more changes to the database based at least in part on execution the first transaction stored in the first cache, wherein the second subset of one or more changes are committed before the first subset of one or more changes.

19. A method comprising:
receiving, through a page of a user interface, a request to submit a plurality of changes to a set of data objects;
responsive to receiving the request through the page of the user interface:
identifying, based on the page of the user interface through which the request was submitted, a first subset of one or more changes, of the plurality of changes, that require further review before being committed to a database and a second subset of one or more changes, of the plurality of changes, that do not require further review before being committed to the database;
generating, within different caches, separate transactions for the first subset of one or more changes and the second subset of one or more changes, wherein the separate transactions include a first transaction that is stored in a first cache for transactions requiring further review before being committed to the database and a second transaction that is stored in a second cache for transactions that do not require further review before being committed to the database;
committing the second subset of one or more changes to the database based at least in part on execution of the second transaction stored in the second cache; and
committing the first subset of one or more changes to the database based at least in part on execution the first transaction stored in the first cache, wherein the second subset of one or more changes are committed before the first subset of one or more changes.

20. The one or more non-transitory computer-readable media of claim 1, wherein said identifying is based on rules defined for different user interface elements on the page of the user interface; wherein the first subset of one or more changes are entered through a first user interface element on the page associated with a first rule and the second subset of one or more changes are entered through a second user interface element on the page associated with a second rule.

* * * * *